US012646994B2

(12) United States Patent
Wang et al.

(10) Patent No.: US 12,646,994 B2
(45) Date of Patent: Jun. 2, 2026

(54) MOTOR

(71) Applicant: NIDEC CORPORATION, Kyoto (JP)

(72) Inventors: Yu Wang, Liaoning (CN); Keisuke Yoshino, Kyoto (JP); Yonggang Yang, Liaoning (CN); Masashi Omi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 239 days.

(21) Appl. No.: 18/489,839

(22) Filed: Oct. 18, 2023

(65) Prior Publication Data

US 2024/0136883 A1 Apr. 25, 2024
US 2024/0235315 A9 Jul. 11, 2024

(30) Foreign Application Priority Data

Oct. 20, 2022 (CN) .......................... 202222772919.5

(51) Int. Cl.
*H02K 5/10* (2006.01)
*H02K 5/06* (2006.01)

(52) U.S. Cl.
CPC ....................................... *H02K 5/06* (2013.01)

(58) Field of Classification Search
CPC .. H02K 5/00; H02K 5/04; H02K 5/06; H02K 5/10; H02K 5/12; H02K 5/128; H02K 5/14; H02K 5/15; H02K 5/17; H02K 5/173; H02K 5/1732; H02K 5/20; H02K 5/203; H02K 5/22; H02K 5/225
USPC ........................................................... 310/89
See application file for complete search history.

(56) References Cited

U.S. PATENT DOCUMENTS

| | | | | |
|---|---|---|---|---|
| 2016/0218583 A1* | 7/2016 | Hayashi | ................. | H02K 9/227 |
| 2019/0372418 A1* | 12/2019 | Ogawa | ..................... | H02K 5/10 |
| 2022/0271605 A1* | 8/2022 | Makino | ................. | H02K 7/006 |
| 2022/0385145 A1* | 12/2022 | Okamoto | .............. | H02K 5/225 |
| 2023/0283142 A1* | 9/2023 | Hattori | ................... | H02K 11/33 310/71 |

* cited by examiner

*Primary Examiner* — Michael Andrews
(74) *Attorney, Agent, or Firm* — JCIPRNET

(57) ABSTRACT

This disclosure provides a motor. The motor includes a housing and a lid molded by pressing. The lid includes a first wall portion extending along an axial direction. One side in the axial direction of the first wall portion is tightly fitted or loose-fitted to the housing, and the other side in the axial direction of the first wall portion is connected to an external device. This structure facilitates coaxial alignment and connection between the housing and the lid and reduces costs.

10 Claims, 3 Drawing Sheets

MOTOR

CROSS REFERENCE TO RELATED APPLICATIONS

The present application claims priority under 35 U.S.C. § 119 to Chinese Application No. 202222772919.5 filed on Oct. 20, 2022 the entire contents of which are hereby incorporated herein by reference.

FIELD OF THE INVENTION

The disclosure relates to a motor.

BACKGROUND

In a conventional motor, the housing and the lid are both aluminum castings and may be connected together by screws. With such a conventional motor, the number of motor components increases with the number of screws used to connect the housing and the lid. As a result, the cost of the motor becomes higher.

The above description of the background art is provided to facilitate a clear and complete explanation of the technical solutions disclosed herein, as well as to enhance the understanding of those skilled in the art. It should not be construed as implying that it is well-known to those skilled in the art.

For example, in response to mounting the motor and an external device such as EPS (electric power steering), depending on the specifications required by the external device, the distance (axial direction distance) between the upper (other side in the axial direction) edge portion of the lid and the plane on which through holes around the lid are provided has to meet certain dimensions while connecting the external device and the motor via the through holes with the upper edge portion of the lid facing the external device.

In addition, in order to reduce the cost, the discloser considered utilizing iron pressed articles instead of aluminum castings to construct the housing and the lid and inserting the bottom of the housing into a recessed portion of the lid, and connecting the lid and the housing through TOX (registered trademark) caulking. However, unlike connecting with screws, with TOX caulking, it is necessary to ensure that the coaxiality of the housing and the lid does not deviate during the connecting process, which may make the process more difficult.

SUMMARY

A motor according to an example of embodiment of the disclosure includes a housing and a lid molded by pressing. The lid includes a first wall portion extending along an axial direction. One side in the axial direction of the first wall portion is tightly fitted or loose-fitted to the housing. The other side in the axial direction of the first wall portion is connected to an external device.

The following description and drawings provide a detailed explanation of example of embodiments disclosed herein. However, it should be understood that the scope and terms of the claims are not limited thereto and encompass various modifications, variations, and equivalents.

The term "and/or" as used in this specification refers to the same or similar manner of usage, whether in one or more other embodiments, in combination with other embodiments, or as a substitution for certain components in other embodiments.

The term "comprising/including/having" indicates the presence of a technical feature, component, or assembly, but does not exclude the presence of one or more other technical features, components, or assemblies.

DETAILED DESCRIPTION

Figure 1:
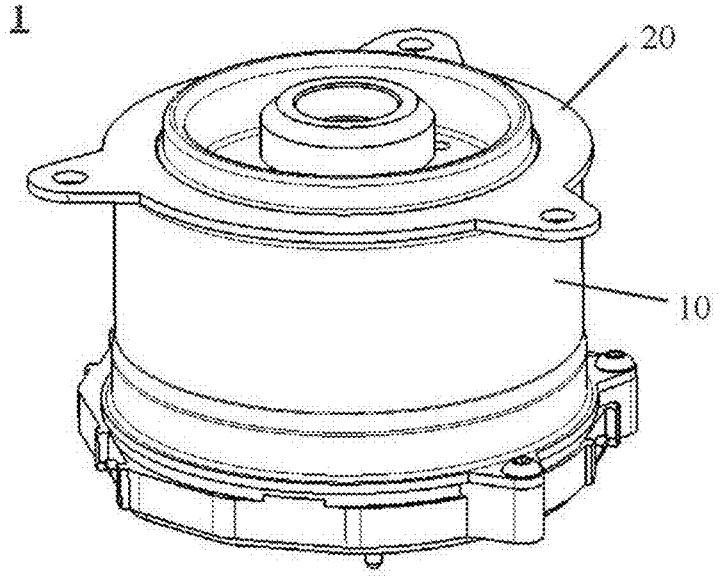
FIG. 1 is a perspective view of an example of motor according to the disclosure.

The drawings and the specification illustrate the features of the disclosure. The drawings and the specification specifically disclose one example of embodiment of the disclosure. However, the disclosure is not limited to the embodiments described in the drawings and the specification, but encompasses all modifications, variations, and equivalents falling within the scope of the claims.

In the following description, terms such as "first," "second," "upper," and "lower" are used to distinguish different elements, but these elements do not necessarily imply temporal or spatial sequence, and these elements are not to be construed as limiting by these terms. The term "and/or" includes any one and all combinations of one or more of the related terms listed. The terms "including," "comprising," "having," etc., indicate the presence of a feature, element, component, or assembly, but do not exclude the presence or addition of one or more other features, elements, components, or assemblies.

In addition, terms such as "one" and "the" in singular form include plural forms and should be broadly understood as "one kind of or" one type of rather than being limited to the specific meaning of "one." Also, the expression "the above-mentioned" includes both singular and plural forms unless specifically indicated otherwise in the context. Moreover, the term "based on" should be understood to mean "at least partially based on . . . " unless specifically indicated otherwise in the context.

Further, a direction extending along the central axis of the motor or a direction in parallel thereto is referred to as "axial direction," a direction along the radius with the central axis as the center is referred to as the "radial direction," and a direction surrounding the central axis is referred to as the "circumferential direction." Moreover, a direction away from the central axis along the direction of the radius is referred to as "outside in the radial direction," and a direction toward the central axis along the direction of the radius is referred to as "inside in the radial direction." A direction pointing from the bottom of the housing toward the opening of the housing along the axial direction is referred to as "one side in the axial direction," "lower side in the axial direction," "lower side," or "below." A direction pointing from the opening of the housing toward the bottom of the housing along the axial direction is referred to as "other side in the axial direction," "upper side in the axial direction," "upper side," or "above." These terms are used for convenience in explanation and do not limit the orientation of the motor when actually used and manufactured.

Figure 2:
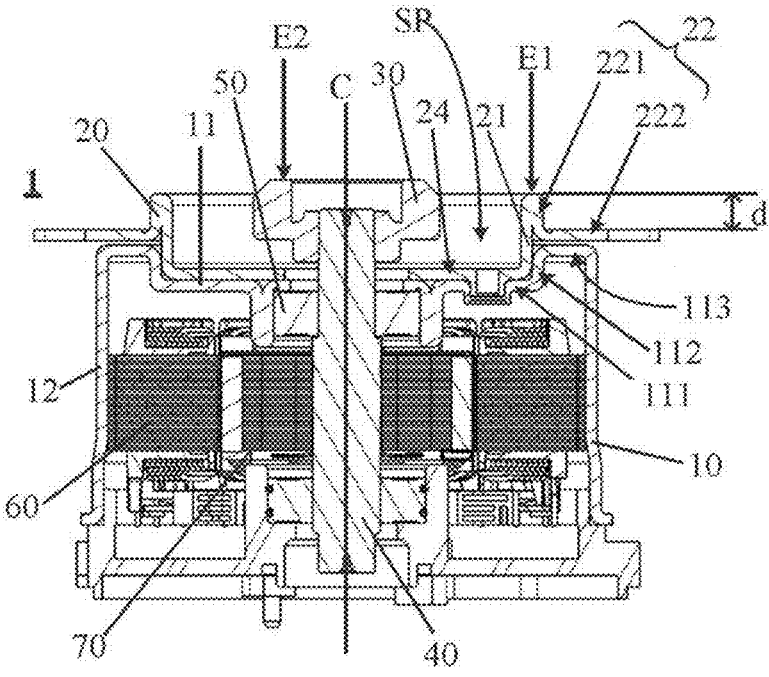
FIG. 2 is a longitudinal cross-sectional view of the example of motor according to the disclosure.

FIG. 1 is a perspective view of an example of motor according to the disclosure. FIG. 2 is a longitudinal cross-sectional view of the example of motor according to the disclosure.

Figure 3:
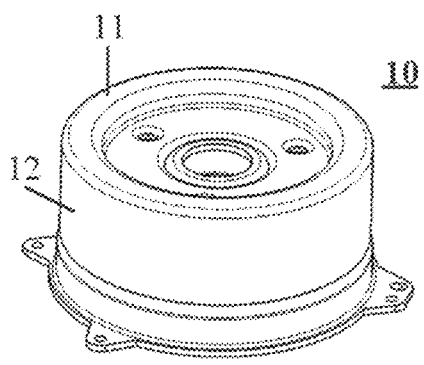
FIG. 3 is a perspective view of the housing of the example of motor according to the disclosure.
Figure 4:
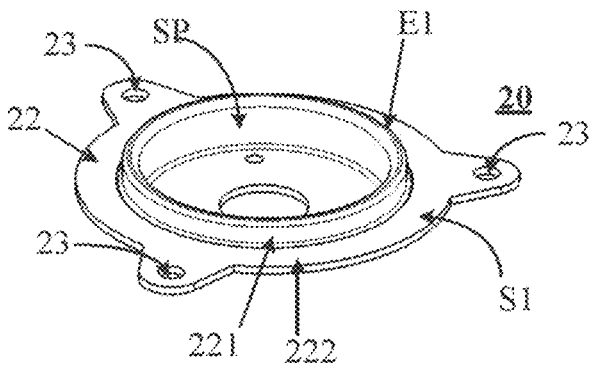
FIG. 4 is a perspective view of the lid of the example of motor according to the disclosure.

As shown in FIG. 1 and FIG. 2, a motor 1 of this embodiment includes a housing 10 and a lid 20 molded by pressing. FIG. 3 is a perspective view of the housing 10 of the example of motor according to the disclosure. FIG. 4 is a perspective view of the lid 20 of the example of motor according to the disclosure. The lid 20 has a first wall portion 21, an outer edge portion 22, and a second radially extending portion 24. As shown in FIG. 2, the lid 20 includes the first wall portion 21 extending along the axial direction. One side in the axial direction of the first wall portion 21 is tightly fitted or loose-fitted to the housing 10. The other side in the axial direction of the first wall portion 21 is connected to an external device (not shown).

According to this embodiment, in the lid 20, the one side in the axial direction of a wall portion (first wall portion 21) extending along the axial direction is tightly fitted or loose-fitted to the housing 10, and in the lid 20, the other side in the axial direction of the wall portion (first wall portion 21) extending along the axial direction is connected to the external device for ensuring the coaxiality of the lid 20 and the housing 10. As a result, the coaxiality of the lid 20 and the housing 10 is ensured even in the TOX caulking process, which is described subsequently, which enables the lid 20 and the housing 10 to be easily connected.

As shown in FIG. 2 and FIG. 4, the lid 20 further includes the outer edge portion 22 connected to the other side in the axial direction of the first wall portion 21 and extending along a direction away from a central axis C. The outer edge portion 22 is provided with a mounting hole 23 penetrating the outer edge portion 22 in the axial direction. The mounting hole 23 is closer to the one side in the axial direction than an end (upper edge portion E1 of the lid 20) of the first wall portion 21 on the other side in the axial direction. That is, the mounting hole 23 is located below the upper edge portion E1 of the lid 20 in the axial direction.

In this embodiment, an axial direction distance d between the end (upper edge portion E1) of the first wall portion 21 on the other side in the axial direction and the mounting hole 23 defines a predetermined distance. The predetermined distance is a dimension required for mounting with the external device. It is noted that the distance d is not specifically limited and may be set to any value. In this embodiment, as shown in FIG. 2 and FIG. 4, the distance d between the upper edge portion E1 of the lid 20 and a plane S1 on which the mounting hole 23 is defined meets the dimension required for mounting with the external device.

According to this embodiment, the motor 1 and the external device are connected to each other while being positioned through the first wall portion 21 and the mounting hole 23.

In this embodiment, the structure of the outer edge portion 22 is not limited. FIG. 2 and FIG. 4 show one example of the outer edge portion 22.

As shown in FIG. 2 and FIG. 4, in this embodiment, the outer edge portion 22 includes an axial extension portion 221 and a first radially extending portion 222. The axial extension portion 221 is connected to the end (upper end) of the first wall portion 21 on the other side in the axial direction and bends and extends toward the one side in the axial direction (lower side in the axial direction). The first radially extending portion 222, on which the mounting hole 23 is defined, is connected to the axial extension portion 221 and bends and extends toward the outside in the radial direction. The axial extension portion 221 is a substantially cylindrical portion. The first radially extending portion 222 is substantially annular, as viewed from the axial direction. The first radially extending portion 222 has multiple protrusions projecting toward the outside in the radial direction. In this embodiment, the protrusions are evenly spaced in the circumferential direction and located closer to the outside in the radial direction than the housing 10. The mounting hole 23 is provided on each of the protrusions.

As a result, the first radially extending portion 222, on which the mounting hole 23 is defined, is located on the one side in the axial direction with respect to the end (upper edge portion E1 of the lid 20) of the first wall portion 21 on the other side in the axial direction. That is, since the first radially extending portion 222 is located below the upper edge portion E1 of the lid 20 in the axial direction, the axial direction distance d between the end (upper edge portion E1) of the first wall portion 21 on the other side in the axial direction and the mounting hole 23 (first radially extending portion 222) is able to be defined to a predetermined distance.

Moreover, the first wall portion 21 is located inside in the radial direction of the axial extension portion 221 and overlaps with the axial extension portion 221 in the radial direction. That is, the first wall portion 21 and the axial extension portion 221 define a double wall structure of the lid 20. Thereby, the double wall structure is able to improve the rigidity of the portion where the lid 20 and the housing 10 are connected and further improve the reliability of the connection between the motor 1 and the external device in this embodiment. Further, the lid 20 is defined by bending a pressed member twice. More specifically, the lid 20 is defined by bending toward the lower side in the axial direction along the axial direction from the upper edge portion E1 and further bending toward the outside in the radial direction, which enables a portion that determines the positions of the housing 10 and the external device in the axial direction to be defined by easy molding. A portion of the lid 20 has a double wall structure produced by two bending processes.

In other embodiments, the outer edge portion 22 may have only one extension portion, and the mounting hole 23 may be defined in the extension portion. For example, in response to the axial direction distance d between the mounting hole 23 and the upper edge portion E1 being the predetermined distance, the outer edge portion 22 may extend from the upper edge portion E1 to the outside in the radial direction and the lower side in the axial direction (i.e., extending toward a direction that intersects the axial direction).

Alternatively, the outer edge portion 22 may have two radially extending portions and one axial extension portion. For example, one radially extending portion may extend from the upper edge portion E1 of the lid 20 toward the outside in the radial direction. The axial extension portion may extend from the tail end of the radially extending portion toward the lower side in the axial direction. The other radially extending portion may extend from the tail end of the axial extension portion toward the outside in the radial direction. The mounting hole 23 may be defined in the other radially extending portion. At this time, the axial direction distance d between the other radially extending portion and the upper edge portion E1 of the lid 20 is set to the predetermined distance.

In this embodiment, the mounting hole 23 does not overlap with the housing 10 as viewed from the axial direction. That is, the mounting hole 23 is located outside the housing 10 in the radial direction. As a result, there is no interference from other components either above or below the mounting hole 23 in the axial direction, making the mounting of the motor 1 to the external device easier.

In this embodiment, as shown in FIG. 2, the housing 10 has a bottom 11 and a housing wall portion 12 extending from the edge of the bottom 11 along the axial direction. For example, the housing wall portion 12 is substantially cylindrical, and the cylindrical housing wall portion 12 has an opening facing the bottom 11 in the axial direction.

In this embodiment, the second radially extending portion 24 extending toward the inside in the radial direction is connected to the one side in the axial direction (lower side in the axial direction) of the first wall portion 21. The second radially extending portion 24 overlaps with the bottom 11 of the housing 10 in the axial direction. The second radially extending portion 24 is fixed to the bottom 11 of the housing 10. More specifically, the second radially extending portion 24 of the lid 20 is fixed to at least a portion of the bottom 11 of the housing 10 by a predetermined fixing method, which allows the lid 20 to be reliably connected to the housing 10.

Figure 5:
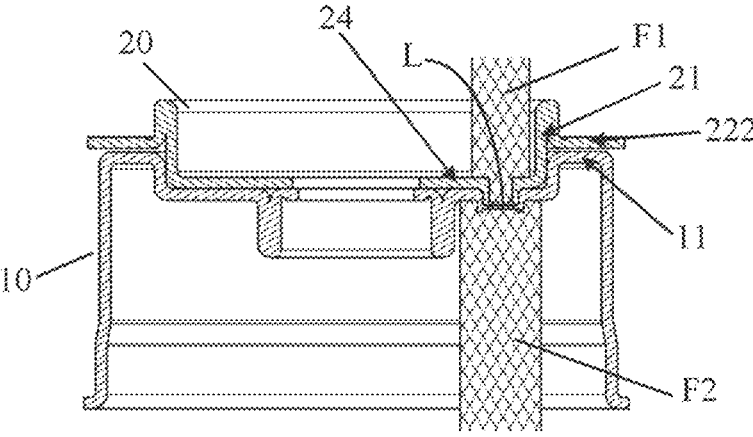
FIG. 5 is a longitudinal cross-sectional view of the example of motor according to the disclosure when the housing and the lid are connected by TOX caulking.
Figure 6:
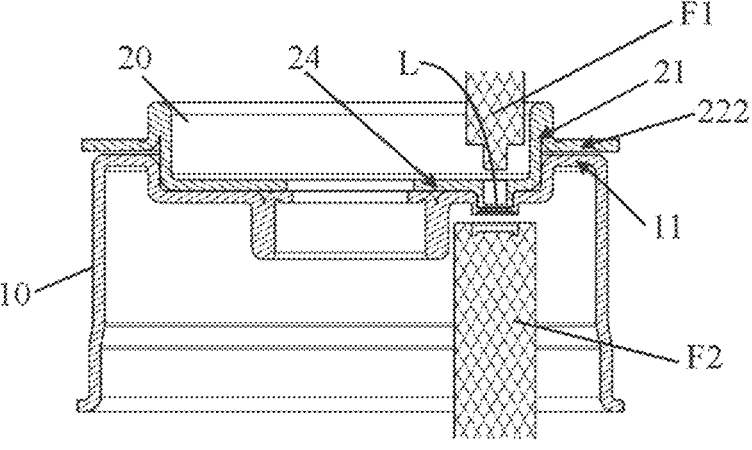
FIG. 6 is a longitudinal cross-sectional view of the example of motor according to the disclosure immediately after the housing and the lid have been connected by TOX caulking.
Figure 7:
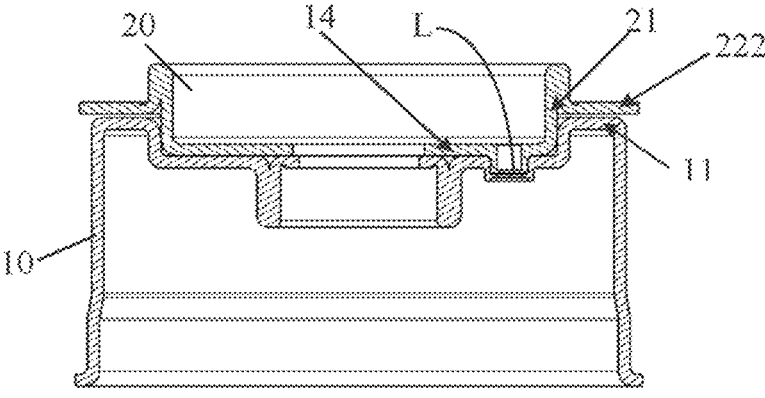
FIG. 7 is a longitudinal cross-sectional view of the example of motor according to the disclosure when connection between the housing and the lid has been completed.

In this embodiment, the lid 20 and the housing 10 are connected to each other by TOX caulking. It should be noted that in other embodiments, any fixing method within the scope of the disclosure may be adopted, which is not limited to TOX caulking. FIG. 5 to FIG. 7 are longitudinal cross-sectional views during the connection of the lid 20 and the housing 10 by TOX caulking. As shown in FIG. 5 to FIG. 7, the second radially extending portion 24 of the lid 20 and the bottom 11 of the housing 10 face each other in the axial direction. As shown in FIG. 5, a TOX caulking tool F1 is disposed on a first connection surface S1 on the one side in the axial direction, and a TOX caulking tool F2 is disposed on a second connection surface S2 on the other side in the axial direction. A TOX connection structure L is defined by TOX caulking and fixing the second radially extending portion 24 and the bottom 11 of the housing 10 with the TOX caulking tools F1 and F2. After the housing 10 and the lid 20 are connected, the TOX caulking tools F1 and F2 are moved in the axial direction respectively, and the TOX caulking tools F1 and F2 are separated from the housing 10 and the lid 20, as shown in FIG. 6 and FIG. 7. In this way, the connection between the housing 10 and the lid 20 is achieved.

Here, FIG. 5 shows a situation where the TOX caulking tools F1 and F2 are not separated. FIG. 6 shows a situation where the TOX caulking tools F1 and F2 are gradually separated. FIG. 7 shows a situation where the TOX caulking tools F1 and F2 are completely separated.

In this embodiment, as shown in FIG. 5 to FIG. 7, at least a portion of the first radially extending portion 222 faces the bottom 11 of the housing 10 and defines an axial direction gap with the bottom 11 of the housing 10. Thus, when the second radially extending portion 24 and the bottom 11 of the housing 10 are fixed, the first radially extending portion 222 and the bottom 11 do not contact each other. In other words, since a gap is defined between the first radially extending portion 222 and the bottom 11 of the housing 10, when connecting the lid 20 and the housing 10, the influence caused by the contact between the first radially extending portion 222 and the bottom portion 11 is able to be minimized. For example, the axial direction position of the lid 20 with respect to the housing 10 is prevented from deviating from the desired position due to the contact between the first radially extending portion 222 and the bottom 11.

In this embodiment, the outer circumference of the first wall portion 21 of the lid 20 on the one side in the axial direction (lower side in the axial direction) is tightly fitted or loose-fitted to the housing 10, as shown in FIG. 2. More specifically, inside a recessed portion defined in the bottom 11 of the housing 10, the first wall portion 21 is disposed in a tightly fitted or loose-fitted manner. The inner circumference of the first wall portion 21 of the lid 20 defines a housing space SP recessed toward the one side in the axial direction (lower side in the axial direction) with the central axis C as the center, and the housing space SP accommodates a motor output terminal 30.

In this embodiment, the fixing position (e.g., the position of the above-mentioned TOX caulking) of the second radially extending portion 24 and the bottom 11 of the housing 10 is located between the motor output terminal 30 and the first wall portion 21 in the radial direction. There is a gap between the motor output terminal 30 and the first wall portion 21 in the radial direction. As a result, the working space for the fixing position is secured, and the fixing work is facilitated.

In this embodiment, in several examples of forms, as shown in FIG. 2, a top portion E2 of the motor output terminal 30 is higher than a plane on which the upper edge portion E1 of the first wall portion 21 is provided. That is, in the axial direction, the top portion E2 of the motor output terminal 30 is located above the upper edge portion E1 of the lid 20. As a result, an operator or the like is able to easily mount the motor output terminal 30 to the external device, and reliably transmit the output of the motor to the external device.

In the above embodiment, the motor output terminal 30 is, for example, a coupling and is connected to a rotary shaft 40 of the motor.

In this embodiment, as shown in FIG. 2, the bottom 11 of the housing 10 includes a first housing extending portion 111 extending along a direction perpendicular to the axial direction, as well as a second wall portion 112 extending toward the other side in the axial direction (upper side in the axial direction) along the axial direction from an outer circumferential edge of the first housing extending portion 111.

In this embodiment, an inner circumference of the second wall portion 112 is tightly fitted or loose-fitted to the one side in the axial direction (lower side in the axial direction) of the first wall portion 21. As a result, tightly fitting or loose-fitting the outer circumference of the first wall portion 21 and the inner circumference of the second wall portion 112 in the radial direction is able to connect the lid 20 and the housing 10 while ensuring the coaxiality of the lid 20 and the housing 10.

In this embodiment, as shown in FIG. 2, the bottom 11 of the housing 10 may further include a second housing extending portion 113 extending toward the outside in the radial direction from an end of the second wall portion 112 on the other side in the axial direction (upper side in the axial direction).

In this embodiment, a portion of the lid 20 faces the second housing extending portion 113 across a gap.

Only the structure related to the motor 1 of this embodiment has been described above. The motor 1 may further include other configurations or structures, such as a bearing 50, a stator 60, and a rotor 70, as shown in FIG. 2.

The motor of the disclosure is not limited to a motor for EPS, and may be used for various purposes, as long as it does not deviate from the spirit of the disclosure.

Based on the above embodiment, the connection between the lid and the housing is facilitated by tightly fitting or loose-fitting the one side in the axial direction of the lid of the motor to the housing and connecting the other side in the axial direction of the lid to the external device.

Illustrative embodiments of the present disclosure are described above in detail with reference to the drawings to illustrate the forms in which the principles of the present disclosure may be employed. While examples of embodiments of the present disclosure have been described above, it is to be understood that variations and modifications will be apparent to those skilled in the art without departing from the scope and spirit of the present disclosure.

What is claimed is:

1. A motor, comprising:

a housing; and a lid molded by pressing, wherein the lid comprises a first wall portion and an outer edge portion, the first wall portion is extending along an axial direction, one side in the axial direction of the first wall portion is fitted to the housing while an outer circumference of the first wall facing an outside of a radial direction is fitted to the housing with contact, and other side in the axial direction of the first wall portion is connected to an external device, the outer edge portion is connected to the other side in the axial direction of the first wall portion and extending along a direction away from a central axis, and the outer edge portion comprises an axial extension portion connected to the end of the first wall portion on the other side in the axial direction and bending and extending toward the one side in the axial direction, and a first radially extending portion connected to the axial extension portion and bending and extending toward the outside in the radial direction.

2. The motor according to claim 1, wherein the outer edge portion has a mounting hole penetrating the outer edge portion in the axial direction, the mounting hole is located closer to the one side in the axial direction than an end of the first wall portion on the other side in the axial direction, and an axial direction distance between the end of the first wall portion on the other side in the axial direction and the mounting hole is a predetermined distance.

3. The motor according to claim 2, wherein the mounting hole is defined on the first radially extending portion.

4. The motor according to claim 3, wherein the mounting hole does not overlap with the housing as viewed from the axial direction.

5. The motor according to claim 3, wherein the one side in the axial direction of the first wall portion is connected to a second radially extending portion extending toward an inside in the radial direction, and the second radially extending portion is fixed to a bottom of the housing.

6. The motor according to claim 5, wherein at least a portion of the first radially extending portion faces the bottom and has an axial direction gap with the bottom.

7. The motor according to claim 5, wherein an inner circumference of the first wall portion defines a housing space recessed toward the one side in the axial direction with the central axis as a center and accommodates a motor output terminal, and a fixing position of the second radially extending portion and the bottom is located between the motor output terminal and the first wall portion in the radial direction.

8. The motor according to claim 7, wherein a top portion of the motor output terminal is higher than a plane on which an upper edge portion of the first wall portion is provided.

9. The motor according to claim 1, wherein a bottom of the housing comprises a first housing extending portion extending along a direction perpendicular to the axial direction, and a second wall portion extending toward the other side in the axial direction along the axial direction from an outer circumferential edge of the first housing extending portion, wherein an inner circumference of the second wall portion is fitted to the one side in the axial direction of the first wall portion.

10. The motor according to claim 9, wherein the bottom further comprises a second housing extending portion extending toward an outside in the radial direction along the radial direction from an end of the second wall portion on the other side in the axial direction, and a portion of the lid faces the second housing extending portion across a gap.

* * * * *